United States Patent
Kinose et al.

(10) Patent No.: US 6,303,223 B1
(45) Date of Patent: Oct. 16, 2001

(54) FUSED SPHERICAL SILICA FOR LIQUID SEALANT AND LIQUID SEALING RESIN COMPOSITION

(75) Inventors: Yutaka Kinose; Shinsuke Miyabe; Takeshi Sakamoto, all of Tokyo; Hiroyoshi Aikawa; Yoshikazu Watanabe, both of Fukushima, all of (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 09/551,600

(22) Filed: Apr. 17, 2000

(51) Int. Cl.$^7$ .............................. B32B 5/16; C04B 14/04; C09K 3/10
(52) U.S. Cl. ..................... 428/404; 428/407; 106/490; 106/287.34
(58) Field of Search ................................. 428/402, 404, 428/407; 106/490, 287.34

(56) References Cited

U.S. PATENT DOCUMENTS

| | | | | |
|---|---|---|---|---|
| 4,923,520 | * | 5/1990 | Anzai et al. | 106/490 |
| 5,304,243 | * | 4/1994 | Yamaguchi et al. | 106/490 |
| 5,338,353 | * | 8/1994 | Uchino et al. | 106/426 |
| 5,340,781 | * | 8/1994 | Oda et al. | 501/127 |
| 5,641,717 | * | 6/1997 | Castle | 501/33 |

* cited by examiner

*Primary Examiner*—Hoa T. Le
(74) *Attorney, Agent, or Firm*—Armstrong, Westerman, Hattori, McLeland & Naughton, LLP

(57) ABSTRACT

The present invention relates to fused spherical silica for liquid sealant which has a particle size distribution such that maximum particle size is 24 μm, average particle size is 2 to 7 μm, and the proportion of particles having a particle size of 1 μm or less is 1% by weight or less, and the silica has a BET specific surface area of 3 m$^2$/g or less. Fused spherical silica filler of the present invention for liquid sealant can be blended with an epoxy resin or silicone resin which is liquid at normal temperature in high proportion, and can minimize the coefficient of linear expansion of a liquid sealing resin composition.

6 Claims, 1 Drawing Sheet

FUSED SPHERICAL SILICA FOR LIQUID SEALANT AND LIQUID SEALING RESIN COMPOSITION

BACKGROUND OF THE INVENTION

The present invention relates to a liquid sealing resin composition for sealing a slight gap between a substrate and an IC chip, and fused spherical silica for liquid sealant blended therewith.

Demand for high performance and functionality in electronic equipment is increasing with the advent of the multimedia age. In view of this, the shape of IC packages used in electronic equipment tends to be small, thin and of a multiple pin structure. Semiconductor chips are molded by sealing the entire IC chip with an sealant in order to protect fine and complicated electronic circuits formed on the surface thereof from dust or moisture in the air. At present, the material that is most commonly used as an sealant for semiconductor IC chip, is an epoxy resin sealant. This epoxy resin sealant is roughly classified into an epoxy resin sealant for transfer molding and a liquid epoxy resin sealant. The sealant mainly used at present is the epoxy resin sealant for transfer molding, and the use of liquid epoxy resin sealant has heretofore been limited.

However, recently this liquid epoxy resin sealant is beginning to be used as an sealant for the most advanced semiconductor devices, for example, P-PGA (Plastic Pin Grid Array), P-BGA (Plastic Ball Grid Array), flip chip or CSP (Chip Size Package or Chip Scale Package). Of these, many CSPs have a smaller and more complicated structure than conventional devices. The gaps between a substrate and an IC chip in CSPs have been conventionally about 75 to 100 μm. However, in recent years, bump size has become small due to the narrow pitch resulting from a multiple pitch structure, and devices having gaps of about 30 to 50 μm are becoming more common. Further, in the most advanced semiconductor devices, devices having a gap size of 1 mil (25.4 μm) are being developed.

In order to seal these very advanced semiconductor devices, a fine process-ability is required, and as a sealant which can meet this requirement, there has been a demand for development of a liquid epoxy resin sealant having excellent gap permeability.

On the other hand, the conventional liquid epoxy resin sealants have a problem in that stress generated due to difference between the coefficients of linear expansion of the liquid sealant and an IC chip need to be reduced in order to increase the reliability of the sealant. As a method for solving this problem, there is a method of decreasing the coefficient of linear expansion by blending a large amount of silica filler in the liquid epoxy resin sealant, and as a method for solving the problem of fluidity due to this blend of large amount of silica filler, many methods have been proposed in which finely fused spherical silica having excellent low viscosity characteristics is used (for example, Japanese Patent Application Laid-open Nos. Hei 2-59416, and Hei 2-199013).

However, it is difficult to say that conventional liquid epoxy resin sealants have high reliability together with the capability of holding a large amount of silica filler, as well as sufficient gap permeability for sealing slight gaps between a substrate and an IC chip in the most advanced semiconductor devices. For this reason, there has been a demand for development of a liquid epoxy resin sealant having high reliability together with the capability of holding a large amount of silica filler as well as excellent gap permeability, and a silica for a liquid sealant, which imparts this performance from the silica filler side.

Accordingly, an object of the present invention is to provide a liquid sealing resin composition having excellent gap permeability for sealing slight gaps between a substrate and an IC chip and also having high reliability, and a fine spherical silica filler to be filled therein.

SUMMARY OF THE INVENTION

In view of the above, the inventors of the present invention have made extensive investigations, and found that the above conventional problems can be overcame, and excellent gap permeability for sealing slight gaps between a substrate and an IC chip and high reliability can be obtained, if fused spherical silica having specific particle size characteristics and a BET specific surface area.

That is, the present invention provides a fused spherical silica for liquid sealant, characterized in that the fused spherical silica has a maximum particle size of 24 μm, an average particle size of 2 to 7 μm, and a particle size distribution wherein the proportion of particles having a particle size of 1 μm or less is 1% by weight or less, and the silica has a BET specific surface area of 3 $m^2/g$ or less.

The present invention also provides the fused spherical silica for liquid sealant as described above, characterized in that viscosity at 50° C. of a mixture obtained by blending said fused spherical silica for liquid sealant in a maximum amount of 80% by weight with an epoxy resin or silicone resin which is liquid at normal temperature is 20 Pa·s or less.

The present invention also provides a liquid sealing resin composition, characterized by comprising (A) an epoxy resin or silicone resin which is liquid at normal temperature, and (B) said fused spherical silica for liquid sealant as described above.

A fused spherical silica filler for liquid sealant of the present invention can be blended with an epoxy resin or silicone resin which is liquid at normal temperature in high proportion, in which the coefficient of linear expansion of a liquid sealing resin composition can be reduced. As a result, the liquid sealing resin has low viscosity even if it contains the fused spherical silica in high proportion, and therefore has good gap permeability.

BRIEF DESCRIPTION OF THE DRAWINGS

In FIG. 1, each number represents following items respectively. 1: Measurement sample, 2: Cover glass (18 mm×18 mm), 3: Groove having a gap of 30 μm, 4: Groove having a gap of 50 μm and 10: Testing mold.

DETAILED DESCRIPTION OF THE INVENTION

Figure 1:
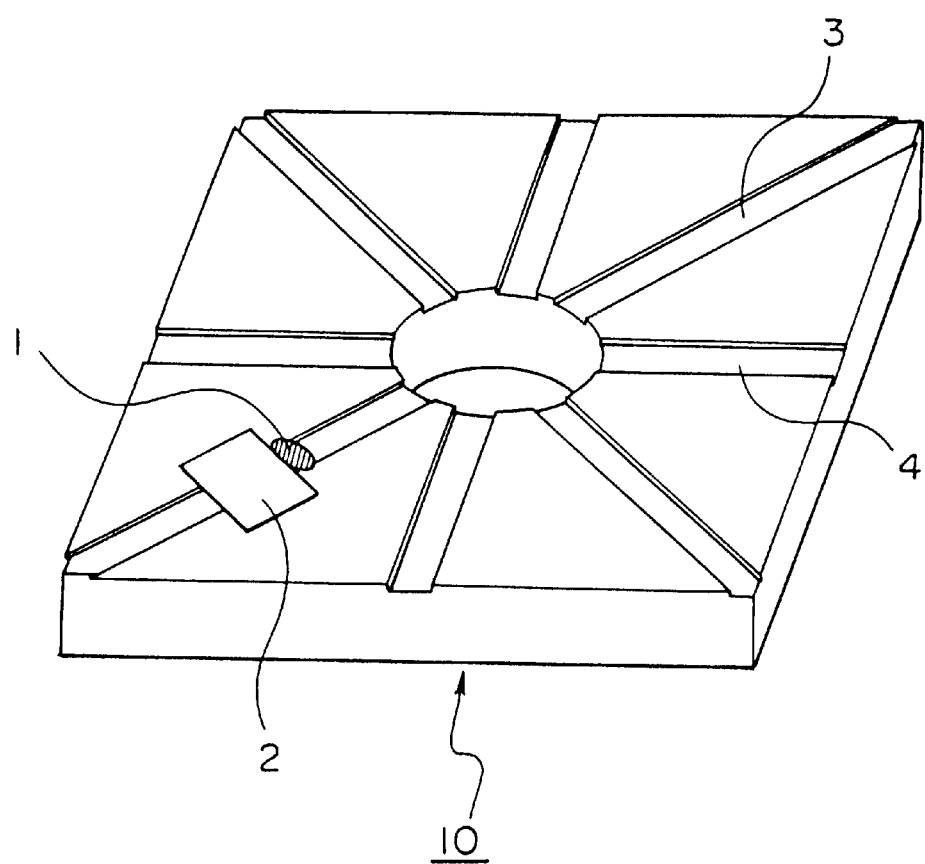
FIG. 1 is a perspective view showing a mold for evaluating gap permeability.

Hereinafter, the present invention will be described in detail.

The present invention provides a fused spherical silica for liquid sealant, in which a maximum particle diameter is 24 μm, an average particle size is 2 to 7 μm, a particle size distribution with a proportion of particles having a particle size of 1 μm or less being 1% by weight of the total amount of particles, and having a BET specific surface area of 3 $m^2/g$ or less.

The present invention further provides the liquid sealing resin composition comprising (A) an epoxy resin or silicone resin which is liquid at normal temperatures, and (B) the fused spherical silica for liquid sealant, which has a particle size distribution such that maximum particle size is 24 μm, average particle size is 2 to 7 μm, and the proportion of particles having a particle size of 1 μm or less is 1% by weight of the total amount of particles, and has BET specific surface area of 3 m²/g or less.

The fused spherical silica used as a filler for liquid sealant of the present invention has the spherically shaped particles, and has particle size characteristics such that maximum particle size is 24 μm, average particle size is 2 to 7 μm, and particle size distribution with the proportion of particles having a particle size of 1 μm or less is 1 wt % or less, and a BET specific surface area of 3 m²/g or less.

Further, spheroidicity of the fused spherical silica is in a range of 0.91 to 0.99, and preferably 0.93 to 0.99.

When a liquid sealing resin composition is formed using ground silica, the viscosity of the composition increases. This is not preferable.

These measurements of the maximum particle size, the average particle size and the particle size distribution may be conducted using a laser type microtrack particle size analyzer or the like.

A preferable maximum particle size of the fused spherical silica of the present invention is 22 μm. By setting the maximum particle size of the fused spherical silica to 24 μm or less, when a liquid sealing resin composition is formed using same, the resulting composition can sufficiently permeate into gaps between a substrate and an IC chip.

Further, the particles preferably have an average particle size of 3 to 7 μm, and more preferably 3.3 to 6.6 μm. If the average particle size of the fused spherical silica for liquid sealant exceeds 7 μm, it is difficult to make the maximum particle size 24 μm or less even by using classification means.

Further, if the average particle size is less than 2 μm, the proportion of particles having a particle size of 1 μm or less in the particle size distribution increases. As a result, when a liquid sealing resin composition is formed using such particles, the viscosity of the resulting composition increases, leading to poor gap permeability.

A preferable value for the proportion of the particles having a particle size of 1 μm or less in the total particle size distribution of the fused spherical silica for liquid encapsulation of the present invention is 0.96% or less. The proportion of the particles having a particle size of 1 μm or less in the total particle size distribution has a particularly strong relationship with the viscosity when the fused spherical silica is blended with the resin. That is, if the proportion of the particles having a particle size of 1 μm or less exceeds 1%, the viscosity of the liquid sealant rapidly increases, leading to poor gap permeability.

A preferable range of the BET specific surface area of the fused spherical silica for liquid sealant of the present invention is 2.8 m²/g or less. If the value of the BET specific surface area exceeds 3 m²/g, the increase of viscosity becomes large, and the gap permeability becomes poor.

Further, the range of the spheroidicity of the fused spherical silica particles for liquid sealant of the present invention is preferably 0.93 to 0.99, and more preferably 0.94 to 0.99. If the spheroidicity of the fused spherical silica particles falls outside the range of 0.91 to 0.99, the gap permeability becomes poorer. The spheroidicity is obtained by image analysis, and is a value calculated by (4 πx surface area)/(square of circumferential length). A device for such image analysis treatment can include, for example, Image Pro Plus (manufactured by Planetron, Inc.), but is not particularly limited thereto. The shape approaches a true sphere as the spheroidicity approaches 1. Therefore, the fused spherical silica for liquid sealant of the present invention is very nearly a true sphere.

The liquid sealing resin composition of the present invention comprises (A) an epoxy resin or silicone resin which is liquid at normal temperatures, and (B) fused spherical silica for liquid sealant having a maximum particle size of 24 μm, an average particle size of 2 to 7 μm, and with a particle size distribution in which the proportion of particles having a particle size of 1 μm or less is 1% by weight or less of the total amount of particles, and the silica has a BET specific surface area of 3 m²/g or less, wherein spheroidicity of the particles is 0.91 to 0.99.

The proportion of the component (B) in the sum of the component (A) and the component (B) is such that when the component (B) is blended in a maximum amount of 80% by weight, the viscosity at 50° C. of the resulting mixture is 20 Pa·s (200 poise) or less, and preferably 18 Pa·s or less.

Since the fused spherical silica for liquid sealant of the present invention has the above-described particle size characteristics, even if it is blended in a high proportion of 80% by weight, the resulting composition has low viscosity. Measurement of the viscosity can be conducted using, for example, an ELD type rotational viscometer.

If a viscosity value at 10 revolutions of a rotational viscometer at 50° C. of a mixture obtained by blending the component (B) in a maximum amount of 80% by weight of the sum of the component (A) and component (B) is designated by $X_1$ Pa·s (or poise), and a viscosity value at 1 revolution thereof is designated by $X_2$ Pa·s (or poise), the ratio ($X_1/X_2$) is 2.0 or less, and preferably 1.5 or less. This value $X_1/X_2$ is called a thixo index, and indicates the degree of viscosity increase according to the number revolutions of the rotational viscometer. Since this fused spherical silica mixture for liquid sealant is such that the fused spherical silica filler to be blended has the above-described particle size characteristics, even if the filler is blended in a high proportion of 80% by weight, the thixo index is preferably low. This thixo index is measured using a conventional rotational viscometer.

The blending amount of the fused spherical silica for liquid sealant of the present invention is 30% by weight or more. However, the upper limit thereof is influenced by the physical properties of silica, and it is possible to blend the silica in an amount up to about 70 to 80% by weight.

In any event, it is important that the fused spherical silica according to the present invention contain Na ions and Cl ions as ionic impurities in water extracted by boiling which are no more than 1 ppm, respectively, and U and Th as radioactive impurities which are no more than 1 ppb, respectively. When a large amount of ionic impurities is contained therein, this is known to cause so-called software errors, and it is necessary to pay particular attention to this when used in semiconductor memory devices.

A method for obtaining the fused spherical silica for liquid sealant of the present invention is not particularly limited, but a preferable method comprises preparing high purity silica gel synthesized by a wet reaction between alkali silicate and mineral acid, grinding this high purity silica gel with a grinding machine such as a ball mill or a jet mill to thereby obtain ground silica gel having an average particle size of, for example, 5 μm, supplying this resultant ground silica gel to a melting furnace to melt same at a temperature not less than the melting point of the silica in oxygen-LPG mixed flame, quenching the molten silica, and collecting the silica with a cyclone to obtain fused spherical silica. If necessary, it is appropriate that this fused spherical silica be subjected to a classification treatment to obtain fused spherical silica for liquid sealant having particle size characteristics of the above range.

The liquid sealing resin composition of the present invention can be obtained by adding and blending the above-described fused spherical silica (B) with an epoxy resin or silicone resin (A) which is liquid at normal temperature.

The normal temperature liquid epoxy resin (A) used in the present invention is a commercially available product and is not particularly limited so long as it is a liquid epoxy resin having at least one epoxy group per molecule.

These liquid epoxy resins include those described in Japanese Patent Application Laid-Open Nos: Hei 6-206982, Hei 9-153570, and Hei 11-67981.

Specific examples of the liquid epoxy resin include those containing, as a main component, liquid epoxy resins such as phenol novolak type epoxy resins, cresol novolak type epoxy resins, bisphenol A type epoxy resins, bisphenol AD type epoxy resins, bisphenol F type epoxy resins, alicyclic epoxy resins, glycidyl ethers of 1,1-bis(4-hydroxyphenyl) ethane, tetrabromobisphenol A type epoxy resin and hydantoin type epoxy resin. These epoxy resins which are liquid at normal temperature can be used alone or as mixtures of two or more thereof.

If necessary, the liquid epoxy resin can contain cure accelerators such as tertiary amines, aromatic hydroxyl group containing tertiary amines such as 4-(imidazo-1-yl) phenol, diazobicyclo compounds, phosphines and phosphoniums, and hardeners such as phenol novolak resins, amines, and acid anhydrides, such as phthalic anhydride, tetrahydrophthalic anhydride, hexahydrophthalic anhydride, methylhexahydrophthalic anhydride, methyltetrahydrophthalic anhydride or isophthalic anhydride. Moreover, the liquid epoxy resin can further contain reactive diluents such as alicyclic epoxy resins; plasticizers such as silicone oil rubber, or rubber type or polyolefin type elastomers; silane coupling agents such as 3-aminopropyl triethoxysilane, or 3-(2-aminoethyl)aminopropyl trimethoxysilane; flame retardants such as antimony trioxide, red phosphorus, or organic phosphorus type flame retardants; and coloring materials such as carbon black or dyes.

The silicone resin that is liquid at normal temperature used in the present invention is a liquid silicone resin represented by, for example, the following general formula (1):

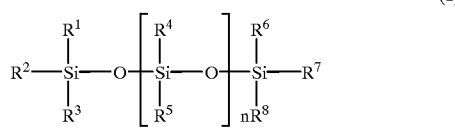

(1)

wherein $R^1$ and $R^2$ represent a monovalent organic acid or hydrogen, $R^3$ and $R^4$ represent a monovalent hydrocarbon group or hydrogen, and n is an integer. Examples of the liquid silicone resin include polydimethylsiloxane oil having a viscosity at 25° C. of 60 poise, polydimethylsiloxane oil having a viscosity at 25° C. of 500 poise, polydimethylsiloxane having a hydroxyl group at the terminals thereof, and polysiloxane having a vinyl group at the terminals thereof.

The fused spherical silica filler for liquid sealant according to the present invention can be blended with a normal temperature liquid epoxy resin or silicone resin in high proportion, and the resulting composition has low viscosity and good gap permeability. For this reason, the fused spherical silica filler for liquid sealant of the present invention is suitably used as a filler for a CSP sealant of a narrow gap size of 24 μm.

The present invention is described below in more detail by reference to the following Examples, but it should be understood that the invention is not limited thereto.

EXAMPLES

Examples 1 to 6 and Comparative Examples 1 to 5

3,285 g of nitric acid aqueous solution ($HNO_3$: 19.3 wt %) was placed in a reactor equipped with a stirrer, and heated to 70° C. Separately, 2,100 g of sodium silicate JIS No. 3 ($Na_2O$: 7.2 wt %, $SiO_2$: 28.5 wt %, $SiO_2/Na_2O$ molar ratio: 3.20) was placed in a vessel and stirred. 0.6 g of EDTA dispersed in a small amount of water was added to the vessel and dissolved. The resulting mixture was stirred at 70° C. for 2 hours. The EDTA-containing sodium silicate aqueous solution thus obtained was added to the nitric acid aqueous solution over about 30 minutes, and during this addition, the temperature of the reactor was maintained at 70–80° C. After the addition, the reaction slurry was stirred at 80° C. for 2 hours to conduct aging. The mother liquor composition at this time was $HNO_3$ 5.0 wt % and $NaNO_3$ 11.1 wt %. Precipitates of silica in the post-reaction slurry were separated by filtration. The silica thus separated was placed in an acid treatment tank equipped with a stirrer, and water and nitric acid were added thereto for adjustment such that the total amount of slurry was 3 liters and the nitric acid concentration in the slurry was 1N. 17 g of 35% hydrogen peroxide water were further added to the thus obtained mixture, and the resulting silica slurry was subjected to an acid treatment under heating at 90° C. for 3 hours while stirring. After completion of the treatment, silica was separated from the slurry by filtration, subjected to washing by repulping with water, solid-liquid separation and drying, respectively, in the conventional manner, and then calcined at 900° C. for 2 hours. Thus, a highly pure silica with low radioactivity was obtained in which all impurities were 5 ppm or less, and U and Th were also 1 ppb or less, respectively. This highly pure silica gel was ground with a grinder such as a ball mill or a jet mill to obtain fused ground silica gel having an average particle size of 5 μm. This fused ground silica gel was supplied to a melting furnace, and melted in oxygen-LPG mixed flame at a temperature of at least the melting point of silica. The fused silica was then quenched and collected with a cyclone to obtain fused spherical silica. The fused spherical silica was subjected to a classification treatment according to the need to obtain fused spherical silicas having certain particle size characteristics. The results obtained are shown in Table 1 below. Particle size, particle size distribution, specific surface area and spheroidicity of the obtained fused spherical silicas, viscosity (at 25° C. and 50° C.) of a mixture obtained by blending fused spherical silica with a normal temperature liquid epoxy resin, and gap permeability of the resulting mixture were measured by the following method. The results obtained are shown in Tables 1 and 2 below. In the Tables, "impossible" means the state in which the mixture could not be kneaded with a glass rod, and "not permeated" means the state of not permeating for 60 minutes or more.

Measurement of average particle size, maximum particle size and particle size of 1 μm or less:

The measurement was carried out using a laser type microtrack particle size analyzer in the conventional manner.

Specific surface area

The measurement was carried out using a BET method monosorb specific surface area measurement device in the conventional manner.

Spheroidicity

The measurement was carried out using an image analysis device, Image Pro Plus (manufactured by Planetron, Inc.) in the conventional manner.

Viscosity at 25° C. and 50° C.

12 g of an epoxy resin (trade name: EPIKOTE 815, manufactured by Yuka Shell Epoxy K.K.) having a viscosity at 25° C. of 0.98 Pa·s (9.8 poise) and 28 g (blending amount: 70% by weight) of fused spherical silica were weighed and placed in a beaker made of polypropylene. The mixture was uniformly mixed with a glass rod, and the viscosity thereof was measured in a constant temperature bath at a predetermined temperature (50° C.) using an ELD type rotational viscometer (manufactured by Tohki Sangyo K.K.) in the conventional manner.

Measurement of Thixo Index 12 g of an epoxy resin (trade name: EPIKOTE 815, manufactured by Yuka Shell Epoxy K.K.) having a viscosity at 25° C. of 0.98 Pa·s (9.8 poise) and 28 g (blending amount: 70% by weight) of fused spherical silica were weighed and placed in a beaker made of polypropylene. The mixture was uniformly mixed with a glass rod, and the viscosity thereof was measured at one revolution and ten revolutions in a constant temperature bath at a predetermined temperature (50° C.) using an ELD type rotational viscometer (manufactured by Tohki Sangyo K.K.) in the conventional manner.

Gap Permeability

A 5 mm wide mold having gaps having a gap size of 30 $\mu$m or 50 $\mu$m, and a length of 18 mm as shown in FIG. 1 was heated to a temperature of 75° C. A measurement sample was placed on a portion of the mold, and the time required to permeate up to one end by capillary action was measured and expressed in "min".

TABLE 1

|  | Maximum particle size $\mu$m | Average particle size $\mu$m | 1 $\mu$m less % | Specific surface area m2/g | Spheroidicity | Viscosity at 50° C. poise | Gap permeability 30 $\mu$m Gap min | Gap permeability 50 $\mu$m Gap min |
|---|---|---|---|---|---|---|---|---|
| Example 1 | 7.8 | 3.3 | 0 | 2.8 | 0.95 | 15 | 18 | 7 |
| Example 2 | 13.1 | 4.0 | 0.25 | 1.8 | 0.95 | 6.5 | 20 | 5 |
| Example 3 | 15.6 | 4.5 | 0.73 | 1.5 | 0.95 | 5.9 | 18 | 5 |
| Example 4 | 18.5 | 5.1 | 0.77 | 1.3 | 0.94 | 5.6 | 20 or more | 4 |
| Example 5 | 18.5 | 6.0 | 0.70 | 1.1 | 0.94 | 5.0 | 20 or more | 3 |
| Example 6 | 22.0 | 6.6 | 0.96 | 0.9 | 0.93 | 4.8 | 20 or more | 3 |
| Comparative example 1 | 5.0 | 2.0 | 0.78 | 5.1 | * | Impossible | Not permeated | 20 or more |
| Comparative example 2 | 31.1 | 10.6 | 0 | 0.8 | 0.88 | 4.4 | Not permeated | Not permeated |
| Comparative example 3 | 22.0 | 5.5 | 1.74 | 2.6 | 0.90 | 32 | Not permeated | Not permeated |
| Comparative example 4 | 32.0 | 12.0 | 1.80 | 4.0 | 0.87 | Impossible | Not permeated | Not permeated |

*Viscosity, impossible: State where the silica could not be kneaded with a glass rod
*Spheroidicity in Comparative Example 1: Fine particles agglomerated, could not be measured.

TABLE 2

|  | Viscosity at 25° C. poise | Viscosity at 50° C. poise | Gap permeability 30 $\mu$m Gap min | Gap permeability 50 $\mu$m Gap Min | Viscosity at one revolution poise | Viscosity at ten revolutions poise | Thixo index |
|---|---|---|---|---|---|---|---|
| Example 1 | or more 100 | 15 | 18 | 7 | 14.7 | 19.2 | 1.31 |
| Example 2 | 70 | 6.5 | 20 | 5 | 6.5 | 8.1 | 1.25 |
| Example 3 | 65 | 5.9 | 18 | 5 | 5.4 | 6.6 | 1.22 |
| Example 4 | 62 | 5.6 | 20 or more | 4 | 4.8 | 5.7 | 1.19 |
| Example 5 | 57 | 5.0 | 20 or more | 3 | 4.5 | 5.3 | 1.18 |
| Example 6 | 55 | 4.8 | 20 or more | 3 | 4.1 | 4.8 | 1.17 |
| Comparative example 1 | Impossible | Impossible | Not permeated | 20 or more | Impossible | Impossible | — |
| Comparative example 2 | 45 | 4.4 | Not permeated | Not permeated | 2.3 | 4.4 | 1.91 |
| Comparative example 3 | Impossible | 32 | Not permeated | Not permeated | 14 | 29 | 2.07 |
| Comparative example 4 | Impossible | Impossible | Not permeated | Not permeated | Impossible | Impossible | — |

What is claimed is:

1. Fused spherical silica for liquid sealant which is obtained by melt forming a silica gel synthesized by wet reaction between alkali silicate and mineral acid into a fused spherical shape, characterized in that the fused spherical silica has a maximum particle size of 24 μm, an average particle size of 2 to 7 μm, and a particle size distribution wherein the proportion of particles having a particle size of 1 μm or less is 1% by weight or less, and the silica has a BET specific surface area of 3 m$^2$/g or less.

2. The fused spherical silica for liquid sealant as claimed in claim 1, wherein said silica has a spheroidicity of 0.91 to 0.99.

3. The fused spherical silica for liquid sealant as claimed in claim 1, characterized in that viscosity at 50° C. of a mixture obtained by blending said fused spherical silica for liquid sealant in a maximum amount of 80% by weight with an epoxy resin or silicone resin which is liquid at normal temperature is 20 Pa·s or less.

4. The fused spherical silica for liquid sealant as claimed in claim 1, characterized in that a ratio ($X_1/X_2$) of a viscosity value $X_1$ Pa·s at 10 revolutions of a rotational viscometer at 50° C. of a mixture obtained by blending said fused spherical silica for liquid sealant in a maximum amount of 80% by weight with an epoxy resin or silicone resin which is liquid at normal temperature to a viscosity value $X_2$ Pa·s at 1 revolution thereof, is 2.0 or less.

5. A liquid sealing resin composition comprising (A) an epoxy resin or silicone resin which is liquid at normal temperature, and (B) said fused spherical silica for liquid sealant as claimed in claim 1.

6. A liquid sealing resin composition comprising (A) an epoxy resin or silicone resin which is liquid at normal temperature, and (B) said fused spherical silica for liquid sealant as claimed in claim 1, characterized in that the blending amount of the component (B) is 30 to 80% by weight in said liquid sealing resin composition.

* * * * *